United States Patent [19]

Bartke et al.

[11] Patent Number: 5,119,300
[45] Date of Patent: Jun. 2, 1992

[54] METHOD FOR RELIABLY OPERATING A MOTOR VEHICLE

[75] Inventors: Ralf-Michael Bartke, Bühl; Gerhard Stumpp, Stuttgart; Dieter Seher, Ilsfeld; Hermann Kull, Stuttgart, all of Fed. Rep. of Germany

[73] Assignee: Robert Bosch GmbH, Stuttgart, Fed. Rep. of Germany

[21] Appl. No.: 551,452

[22] Filed: Jul. 12, 1990

[30] Foreign Application Priority Data

Jul. 12, 1989 [DE] Fed. Rep. of Germany ....... 3922948

[51] Int. Cl.⁵ .................................................. F02B 3/00
[52] U.S. Cl. ................................ 364/431.11; 123/479
[58] Field of Search ............... 364/424.03, 424.04, 364/431.11, 550, 551.01, 565; 73/117.3, 118.1; 340/438, 439; 123/479; 324/160, 161; 371/14

[56] References Cited

U.S. PATENT DOCUMENTS

| | | | |
|---|---|---|---|
| 4,506,338 | 3/1985 | Danno et al. | 371/14 |
| 4,615,321 | 10/1986 | Haefner et al. | 340/438 |
| 4,759,212 | 7/1988 | Sawada et al. | 73/118.1 |
| 4,780,826 | 10/1988 | Nakano et al. | 364/431.11 |
| 4,835,671 | 5/1989 | Sato et al. | 371/14 |
| 4,928,518 | 5/1990 | Tamura | 73/117.3 |

Primary Examiner—Parshotam S. Lall
Assistant Examiner—Michael Zanelli
Attorney, Agent, or Firm—Walter Ottesen

[57] ABSTRACT

Sensors for motor vehicles emit a base signal when the variable which they measure takes on a base value. For example, a road-speed transducer supplies no pulses when either the vehicle is at standstill or when the sensor is defective. A method for providing a reliable operation of a motor vehicle includes the step of starting a substitute/emergency-function immediately when only the base signal is received from the sensor. If it is later determined that the base signal was only emitted because the measured variable took on its base value, then the substitute/emergency-function is again reversed. By starting a substitute/emergency-function basically always when a checked sensor emits no signal, it is ensured that safety measures are taken as rapidly as possible.

16 Claims, 4 Drawing Sheets

METHOD FOR RELIABLY OPERATING A MOTOR VEHICLE

FIELD OF THE INVENTION

The invention relates to a method for operating a motor vehicle with maximum reliability which utilizes the signals of sensors during operating. The functional operability of at least one of the sensors is repeatedly checked. If a malfunction of the checked sensor is determined, then a substitute/emergency-function is initiated and maintained until the sensor is again operational.

BACKGROUND OF THE INVENTION

Road-speed transducers, rotational speed sensors and no-load contacts are representative of the many sensors which are utilized in methods of the kind mentioned above. These sensors, as many other sensors, have in common that they emit a base signal when the variable which they measure takes on a base value with the base signal being identical with the signal corresponding to an inoperable sensor and this condition will now be considered.

If a road-speed transducer malfunctions, then it emits no pulses. The same applies when the transducer is operational; however, the vehicle for which it is intended to measure the road speed stands still. No pulses are then emitted from a rotational speed transducer when it is either defective or the engine for which the speed is to be measured is at standstill or is in the starting phase or shortly after cutoff. A no-load contact is either then closed when a driver presses against the actuating rod or when the driver does not press but the rod is hung up.

In conventional methods, a substitute or an emergency function is started as soon as it is detected that a sensor is not operational. For example, when the rotational speed transducer is inoperative, the rotational speed signal is derived from the signal of an injection-start transducer. This is then a substitute function. In contrast, if the road-speed transducer is inoperative, then the rotational speed of the engine is as a rule limited and this is then an emergency function.

When the variable being checked takes on its base value, it is then not possible for most sensors to reliably decide if it is operational or not. Therefore, substitute/emergency-functions are only started when a determination is made that the checked sensor operates defectively from a plausibility comparison of the signal from the checked sensor with signals from other sensors.

Efforts have been made to configure the above-mentioned plausibility checks so that it can be decided as rapidly as possible whether a sensor is still operational or not in order to trigger the substitute/emergency-functions as rapidly as possible.

SUMMARY OF THE INVENTION

The method of the invention affords the advantage that a switchover to substitute/emergency-functions is especially rapid with sensors of the above-mentioned type which emit a base signal. This is achieved in that a first substitute/emergency-function is basically started as soon as the sensor emits the base signal. Accordingly, the above-mentioned plausibility check is not carried out in order to recognize with certainty whether the sensor is operational or not. Rather, the check as to whether the sensor is operational is only made when the substitute/emergency-function has already been started. If functional operability has been determined, the initiated substitute/emergency-function is reversed as in known methods. However, if functional inoperability has been determined with certainty, then measures are taken which are likewise known for this case from the state of the art such as indicating the error and storing the same.

The method of the invention for providing a reliable operation of a motor vehicle utilizes signals of sensors during operation. The method includes the steps of: checking the functional operability of at least one of the sensors, each of the sensors emitting a base signal when the variable they measure takes on a base value with the base signal being identical to the signal the sensor emits when defective; starting a first substitute/emergency-function as soon as the sensor emits a base signal; then checking as to whether the sensor is with certainty functionally inoperative; and, maintaining the substitute/emergency-function until the sensor is again functionally operational.

The first substitute/emergency-function undertaken can at the same time be the only such function which is undertaken if the functional defect of the checked sensor is assumed or has been determined with certainty. However, it is also possible to configure the first substitute/emergency-function which has already been carried out when functional inoperability has only been assumed so that this function does not act on the operation of the vehicle when the measured variable takes on its base value. A switchover to a second substitute/emergency-function which limits operation more significantly than the first substitute/emergency-function takes place when the functional operability of the checked sensor has later been determined with certainty. If a vehicle is at standstill for example, then the road-speed transducer emits no pulses. However, a first substitute/emergency-function is started which permits a rapid acceleration of the vehicle in that the values for maximum rotational speed and/or maximum fuel quantity can be exceeded for a certain time interval with the values being fixed for the time after the time duration has run. If it develops during this acceleration operation that the road-speed transducer does indeed operate, then the first substitute/emergency-function is cancelled. A second substitute/emergency-function is undertaken if functional inoperability occurs with certainty in which the above-mentioned maximum values are no longer permitted to be exceeded or only for a short time such as during shift operations.

According to other features of the invention, the functional inoperability of a road-speed transducer can be determined with certainty. The load condition of the engine which drives the vehicle is determined and the conclusion can be reached as to the absence of functional operability of the road-speed transducer when the detected load value is higher than would be a maximum at zero load. Zero load means that the engine is neither required to drive the vehicle itself nor that any ancillary drive is connected.

The functional inoperability of the rotational speed transducer can be reliably determined pursuant to another feature of the invention.

BRIEF DESCRIPTION OF THE DRAWINGS

The invention will now be described with respect to the drawings wherein.

DESCRIPTION OF THE PREFERRED EMBODIMENTS OF THE INVENTION

Figure 1:
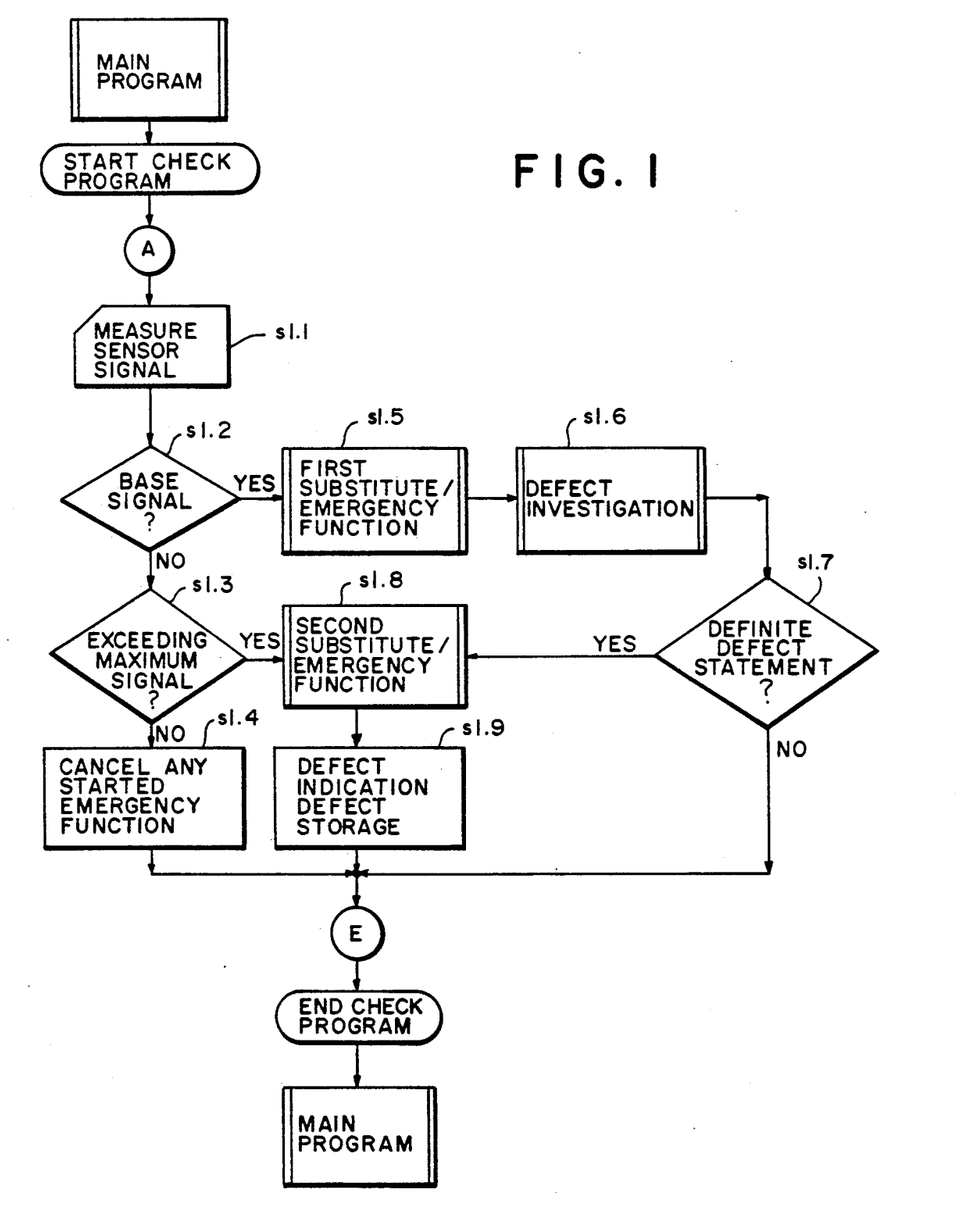
FIG. 1 is a flowchart for explaining the method for obtaining the most reliable operation of a motor vehicle.

The test program according to FIG. 1 is based on the premise that it is called up from a main program and that this main program is continued after the test program has been run through. The actual test program lies between start mark A and end mark E.

The signal of the sensor being checked is measured in a first step s1.1. This can be any sensor which emits a base signal when the variable which it measures takes on a base value such as a rotational speed sensor when the engine on which the sensor is mounted does not rotate. In a step s1.2, a check is made as to whether the base signal is emitted. If this is not the case, then a check is made in a step s1.3 as to whether the signal is above a maximum possible value such as above a pulse number for the maximum possible rotational speed. If this is not the case, then the signal lies between the base signal and the maximum signal and this is an indication that the sensor is operational.

The method then passes via a step s1.4 to the end mark E. In step s1.4, the substitute/emergency-functions are reset as they were set when passing through other steps as will be explained below. Attention is called to the fact that the invention is only concerned with determining the functional operability of a sensor. If functional operability is present, then a measuring error can nonetheless be present; that is, the sensor signal lies between the base signal and the maximum signal but the measuring value is false. A false measuring value can be determined, for example, by a plausibility comparison with other variables. Further steps would then follow after step s1.4 which however is not of interest here.

If it is determined in the checking step s1.2 that the base signal is present, this is then no reliable sign that the checked sensor is defective; however, in a following step s1.5, a first substitute/emergency-function is undertaken. A subprogram step s1.6 follows wherein an error investigation is carried out. If, based on the error investigation, an unequivocal error statement results in step s1.7, then the method passes to a step s1.8 wherein a second substitute/emergency-function is started. The method reaches the end mark E via a step s1.9. An indication and storage of the error takes place in step s1.9.

If the determination is made in step s1.7 that a clear error statement is not possible, then the end mark E is subsequently likewise reached.

If the result is obtained in step s1.3 that the maximum signal is exceeded, then the above-mentioned step sequence s1.8 and s1.9 follow.

When the second substitute/emergency-function cannot be distinguished from the first, then the step s1.9 of the failure indication and the failure memory can continue directly from step s1.7 when an unequivocal error is determined. The step s1.8 then follows only after step s1.3 since in this case a substitute/emergency-function had not already been started.

Figure 2:
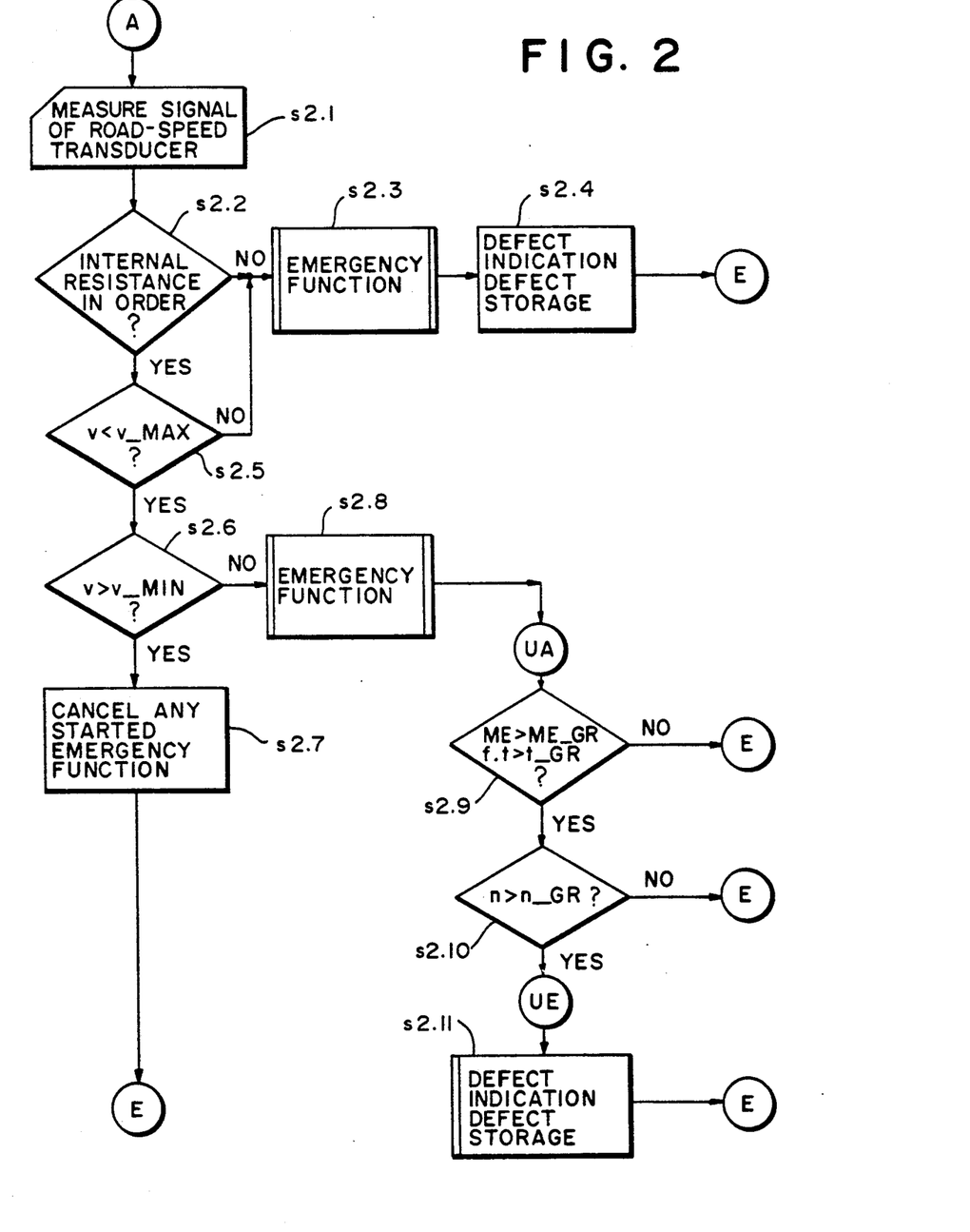
FIG. 2 is a flowchart illustrating the general method of FIG. 1 applied to a method wherein the signal of a road-speed transducer is checked.

The method described generally with respect to FIG. 1 is now viewed with respect to FIG. 2 in the context of an example wherein the sensor checked for functional operability is a road-speed transducer.

In a step s2.1 after the start mark A, a measurement is made in step s2.2 as to whether the internal resistance of the transducer is in order. If this is not the case, an emergency function is set in a step s2.3 pursuant to which the speed and/or the fuel quantity for the engine is limited with the engine driving the motor vehicle on which the road-speed transducer to be checked is mounted. Failure indication and failure storage is provided in step s2.4. The end mark E is then reached.

If step s2.2 determines that the internal resistance is in order, then a check is made in step s2.5 as to whether the speed indicated by the road-speed transducer by a corresponding number of pulses lies below a maximum speed. If this is not the case, that is the maximum speed is exceeded, then the steps s2.3 and s2.4 follow and continue to the end mark E.

If in contrast, the speed v checked in step s2.5 is less than the maximum speed v_MAX, then a check is made in step s2.6 as to whether the speed v is greater than a minimum determined speed v_MIN. If this is the case, then this is the sign for functional operability of the road-speed transducer and the emergency function which may have been introduced is then cancelled in step s2.7. Thereafter, the end mark E is again reached.

If it results in step s2.6 that the measured speed v is not greater than a minimal measurable speed v_MIN, then the emergency function is initiated in a step s2.8. A mark UA is then reached which defines the start of a subprogram which runs until a subprogram end mark UE.

The subprogram between the marks UA and UE in FIG. 2 includes two steps s2.9 and s2.10. In step s2.9, a check is made as to whether the fuel mass ME injected into the engine is greater than a pregiven boundary mass ME_GR. The value for the boundary mass is determined such that it is with certainty greater than that fuel mass (per stroke or per unit of time) which is maximally supplied to the engine when the engine does not have to drive the motor vehicle, that is, when the engine runs at zero load. If a larger quantity of fuel is metered to the engine than it can maximally take at zero load, then this is a reliable indication that the engine is running and driving the motor vehicle, that is, the vehicle is moving.

However, since no speed signal was measured in step s2.6, this is an indication that the road-speed transducer is defective. This statement is however not directly made in step s2.9; instead, because of safety requirements, an additional check is made as to whether the above-mentioned fuel mass condition applies for a time duration t which is longer than a pregiven boundary time duration t_GR. This boundary time duration is so selected that it is greater than that time duration which the engine requires at zero load in order to run up from idle speed to its maximum speed. Within this time duration, the fuel mass metered to the engine can be greater than the boundary mass. When a check in step s2.9 establishes that either the fuel mass metered to the engine is less than the boundary mass or that the time duration in which the reverse condition is fulfilled is shorter than the boundary time duration, then this is an indication that no reliable statement could be made as to whether the road-speed transducer was actually defective or not. The method then reaches the end mark E. In lieu of the fuel mass or fuel quantity, the air mass or air quantity of a mixture compressing internal combustion engine can be subjected to the above-described check.

Step s2.10 constitutes a safety step which is then carried out when it is established in step s2.9 that a fuel mass (per stroke or per unit of time) was metered to the engine for a longer time duration than the time duration corresponding to the limit time duration which is higher than the limit mass (per stroke or per like time duration). This safety step s2.10 considers that the just-mentioned condition cannot only be fulfilled if the engine drives the motor vehicle, but also when it is attempted to continuously start the engine within the time duration checked. If the engine still does not run it reaches only a specific maximum rotational speed imparted to the engine by the starter. A limit rotational speed n_GR is then selected which is with certainty not reached during a starting operation. In step s2.10, this limit rotational speed is compared to the actual measured rotational speed n. If the rotational speed is less than the above-mentioned limit rotational speed, the assumption is made that the condition in step s2.9 is fulfilled only because of the starting operations. In this way, no reliable defect statement can be made and for this reason the end mark E is reached. If, in contrast, the rotational speed n is greater than the rotational speed n_GR in step s2.10 (that is the engine is running), this together with the results from steps s2.6 and s2.9 provides a reliable indication that the road-speed transducer is defective. In this case, a step s2.11 is reached via the end mark UE of the subprogram wherein indication and storage of the defect occurs.

Attention is called to the fact that the determination made above is only applicable when the vehicle concerned has no ancillary drive or with respect to such a vehicle wherein such a drive is present but is switched off which can be determined in that a check is made as to whether an intermediate rotational speed controller is switched on or not. If the intermediate rotational speed controller is switched on, then energy is supplied via an ancillary drive from the engine to an accessory apparatus and the conditions according to the steps s2.9 and s2.10 are as a rule fulfilled even though the road-speed transducer is in order. It is therefore recommended that these steps s2.9 and s2.10 are carried out only when the intermediate rotational speed controller is switched off.

Variations of the subprogram between the marks UA and UE in FIG. 2 will now be described with reference to FIGS. 3 to 5. These embodiments can however be utilized in conventional methods as shown for the embodiment according to FIG. 2 wherein no switchover takes place directly to an emergency function (or a substitute function) when it is determined that the road-speed transducer emits no pulses; instead, only then when functional inoperability thereof is determined with certainty.

All embodiments of the method between the marks UA and UE have in common that a check is made as to whether a load/rotational speed condition is present which cannot be obtained for a stationary vehicle. In the embodiment according to FIG. 2, this was the determination whether the quantity of fuel metered to the engine was greater than the maximum quantity which could be metered at zero load.

Figures 3, 4, 5:
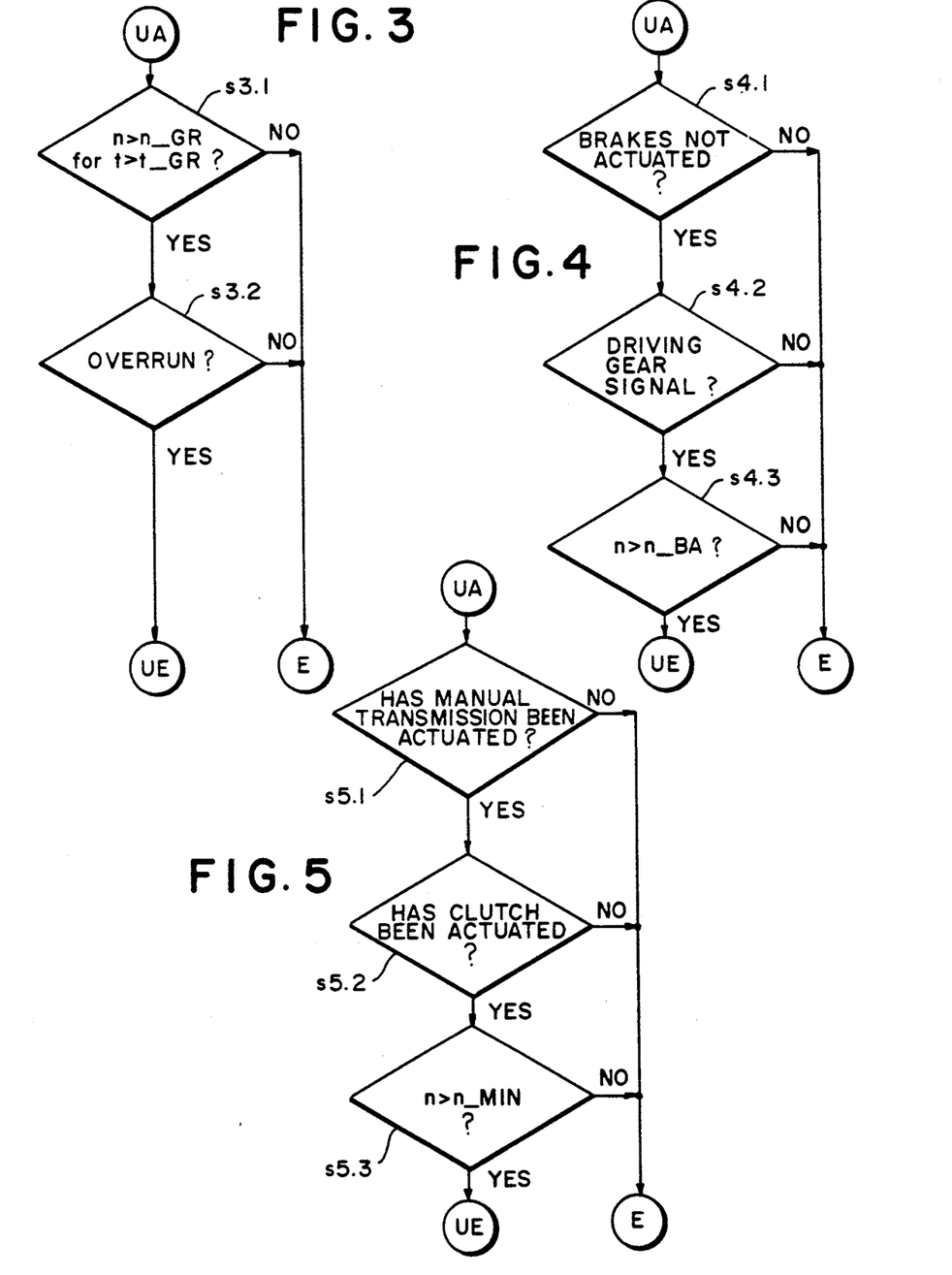
FIG. 3 is a flowchart showing a variation of the method of FIG. 2 wherein an investigation is made as to whether the rotational speed lies above the idle speed even though the accelerator pedal is not depressed.
FIG. 4 is another flowchart of an embodiment of the method of the invention wherein a check is made to determine if the engine is coupled to the drive wheels.
FIG. 5 is a flowchart of the method of claim 4 applied to a vehicle having a gearshift; and, FIG. 6 is a flowchart of the method of the invention wherein the signal of a rotational speed transducer is checked.

In the method according to FIG. 3, a check is made as to whether the rotational speed is greater than the idle rotational speed even though the accelerator pedal is not depressed. For this purpose, a check is made in step s3.1 as to whether the rotational speed n for a time duration t is greater than a limit rotational speed n_GR with the time duration t corresponding to at least a limit time duration t_GR. The limit rotational speed is selected so as to be somewhat higher than that rotational speed which can be reached as a maximum at idle. The limit time duration is somewhat greater than the time duration which the engine requires in order to reach the limit speed starting from its maximum rotational speed at zero load. If the determination is made in step s3.1 that the above-mentioned condition is fulfilled and if thereafter the determination is made in a step s3.2 that this is the case even though the accelerator pedal is not depressed, then this together with the fact that the road-speed transducer emits no pulses is a reliable indication that the transducer is defective. The determination that the accelerator pedal is not depressed is made in step s3.2 in that an inquiry is made as to whether an overrun operation is present and this question is answered in the affirmative. If the conditions in the step s3.1 or s3.2 are not fulfilled, then this is an indication that it cannot be stated with certainty as to whether the road-speed transducer is defective or not. The end mark E is then reached in each case.

In the method according to FIGS. 4 and 5, a check is made as to whether the engine is coupled to the drive wheels and whether the engine is rotating with a specific lowest rotational speed. The vehicle must per force be running if these two conditions are fulfilled. The road-speed transducer is defective if it emits no pulses.

In the method embodiment according to FIG. 4, the premise is made that an automatic transmission is present. In step s4.1, the investigation is made as to whether the brakes are actuated. If this is the case, the assumption is made that the vehicle is at standstill. In any event, nothing reliable can be stated as to the functional operability of the road-speed transducer in this case and for this reason the end mark E is reached. If the brakes are however not actuated, it is possible that the vehicle travels. A check is then made in step s4.2 as to whether a shift has been made into a drive gear. If this is not the case, then the vehicle is probably at standstill. A further defect investigation is in any event not possible and for this reason the end mark E is reached. If instead there is a shift into a driving gear (step s4.2) and the brakes are not actuated (step s4.1), a check is made in step s4.3 as to whether the rotational speed n is greater than an uphill driving speed n_GA. This last rotational speed corresponds to that rotational speed at which the vehicle can be started forward even on a very steep hill. If the rotational speed is less than the above-mentioned rotational speed, then the mark E is reached since no reliable statement can be made as to whether the road-speed transducer is defective. The mark UE is reached if in contrast the rotational speed is exceeded. A step for defect indication and defect storage follows the latter and furthermore, a step to set an emergency function when the method is applied within a conventional method for the most reliable operation of a vehicle. If the method is instead utilized in a method according to FIG. 1, then it is not necessary to initiate an emergency function or a substitute function after step UE since this measure has already been initiated as soon as the determination had been made that the road-speed transducer emits no pulses.

FIG. 5 shows the adaptation of the principle according to FIG. 4 to a vehicle having a shift transmission. In a step s5.1 a check is made as to whether a gear has been shifted into. If this is the case, a control is undertaken in step s5.2 as to whether the coupling is not actuated. If the coupling is not actuated, this means that the engine is connected to the drive wheels. If it develops finally in a step s5.3 that the engine speed n is greater than a minimal rotational speed n_MIN, this is a certain indication that the road-speed transducer is defective. The minimal rotational speed is so selected that even in the lowest gear a road speed is attained for which the road-speed indicator emits measurable pulses with certainty in the event that it is functionally operational.

As the lowest gear, the reverse gear can be considered and its evaluation can be included in the context of the above description in addition to the evaluation of the forward gears.

In the check of the function of the road-speed transducer described above, it should further be considered that slippage occurs for a gear which is shifted into and a coupling which is not actuated and this leads to the condition that a rigid connection between engine and transmission, and therefore also a detectable road speed, is present only after a specific time duration. This means for the above-described check, that the conclusion "road-speed transducer defective" can be made only after a predetermined waiting time has passed for the following conditions: a gear has been shifted into, the coupling is not actuated and a fulfilled rotational speed condition with no road-speed signal being present. After step s5.3, a further step is provided in this case with the aid of which a defective reaction occurs only after a pregiven waiting time has passed and when a road-speed signal continues to fail to appear.

The specific embodiments according to FIGS. 2 to 5 are directed to checking a road-speed transducer and they indicate that an emergency function is set when the functional inoperability of the transducer is assumed or determined. FIG. 1 together with the embodiments described in the introduction make clear however that the functional operability of all sensors can be checked with the principles according to FIG. 1 with the sensors then emitting a base signal when the variable which they measure takes on a base value and that in lieu of an emergency function also a substitute function can be undertaken and that the limits undertaken can be made more critical in a stepwise manner. When a defect is only assumed, lesser limitations can be undertaken and, in contrast, when a defect is determined, significant limitations can be introduced. The manner of the measures to be undertaken is dependent upon the sensor checked. The measures undertaken are those which are known from the state of the art.

As discussed above, the substitute/emergency-function is preferably so selected that it does not become effective when the variable to be measured takes on its base value. It is advantageous to select the range in which the function undertaken does not noticeably affect the operation of the vehicle so that it includes the base value but goes more or less significantly therebeyond and as far as possible in the direction in which the function is not yet noticeable without safety conditions being compromised.

It is noted that the variations according to the embodiments can also be applied in common with the exception of the variations of FIGS. 4 and 5 of which the one is for a motor vehicle having automatic transmission and the other one is for a motor vehicle having a manual transmission.

Figure 6:
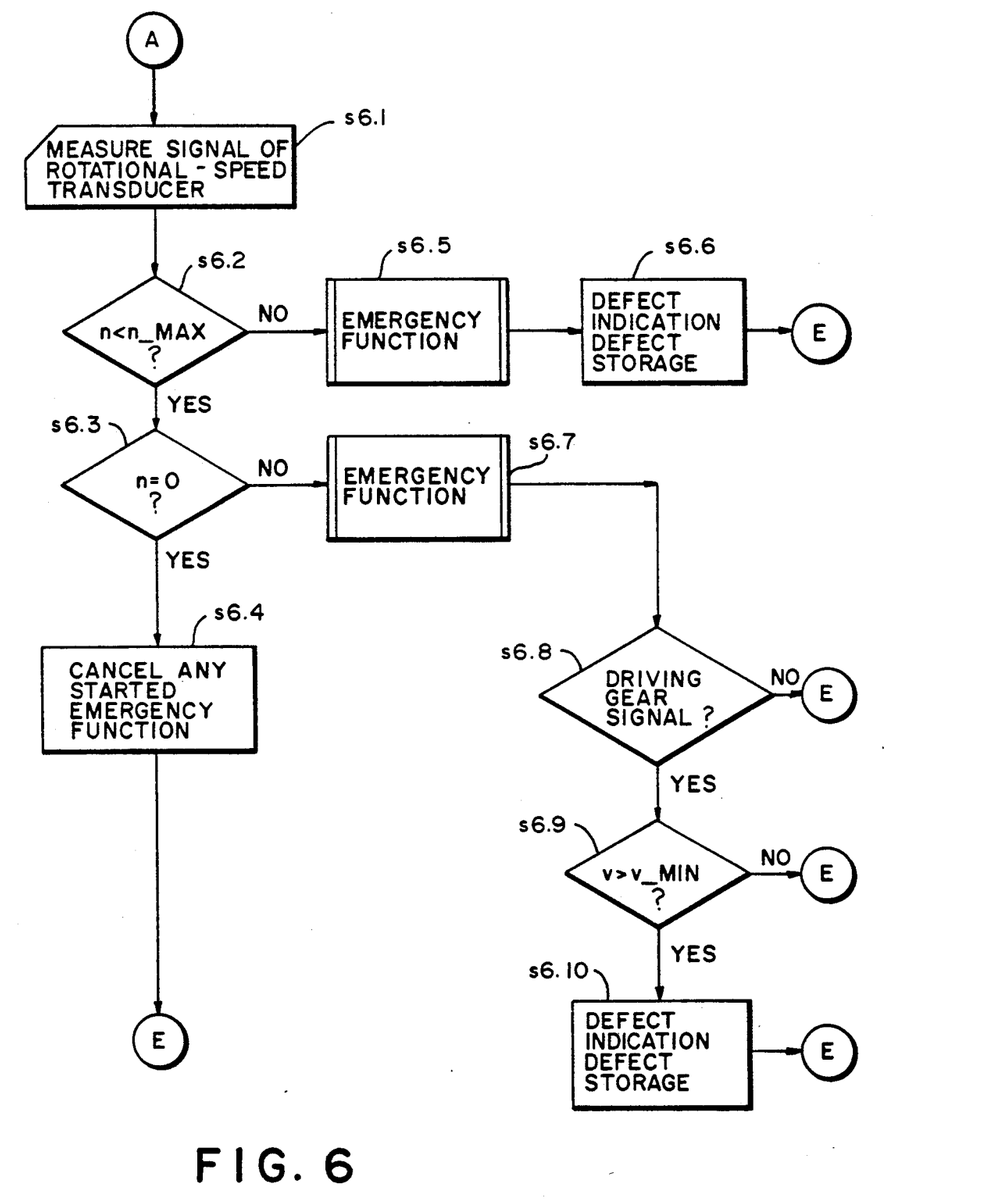

The embodiment according to FIG. 6 relates to the checking of a rotational speed transducer. The rotational speed transducer signal is measured in a step s6.1. In a step s6.2, a check is made as to whether the rotational speed n is greater than a maximum rotational speed n_MAX. If this is not the case, then a check is made in a step s6.3 as to whether the rotational speed is zero. If this too is not the case, an emergency function which has possibly been initiated is cancelled in a step s6.4. The mark E is then reached in the sequence of FIG. 1.

If in step s6.2, it develops that a rotational speed greater than the maximum rotational speed is indicated, then an emergency function is set in a step s6.5, for example, the fuel quantity or air quantity is limited. A defect indication and a defect storage occurs in a step s6.6. Thereafter, the mark E is reached.

If it develops in step s6.3 that the rotational speed is zero which is the case especially during starting or when the ignition is turned on, then an emergency function such as the one mentioned above is set in a step s6.7 and a defect check then only takes place in steps s6.8 and s6.9 before a defect indication and failure storage is undertaken in step s6.10 as may be required. In step s6.8, a check is made as to whether the drive wheels are coupled to the engine, for example, in that the driving gear signal is interrogated when a vehicle is equipped with automatic transmission. If no coupling is present, no reliable defect check is possible and for this reason the mark E is reached. If however a coupling is present, then a check is made in step s6.9 as to whether the road speed v is greater than the minimal speed v_MIN as already explained above for step s2.6. If this is not the case, then the method passes to mark E; otherwise, to the step s6.10 referred to above and then to the mark E.

A comparison of the above-described sequence with the sequence according to FIG. 2 in combination with the detail sequences according to FIGS. 4 or 5 make clear that all of these sequences are based on the same realization that a rotational speed transducer and a road-speed transducer must each simultaneously indicate movement or simultaneously indicate the absence of movement when there is coupling between the engine and the drive wheels. If this is not the case, then a defect is present. In each of the embodiments it is assumed that when one of the transducers shows no movement and the other one of the transducers shows movement that that transducer is defective which announces no movement. These assumptions have been justified in practice. However, it can be easily checked with respect to the rotational speed transducer signal whether this signal is plausible, for example, by a comparison with ignition pulse signals or injection pulse signals which as a rule are obtained for the other transducers.

The methods pursuant to all of the embodiments are characterized in that they are adequate with sensors which are in any event provided in motor vehicles having modern vehicle electronics.

It should be mentioned that for electronic diesel control systems as a rule the internal combustion engine is brought to standstill for reasons of safety when the rotational speed sensor becomes defective. Therefore, no substitute or emergency operation is initiated. An emergency operation is easily possible in diesel systems having an electronic accelerator pedal because of the mechanical injection pump.

It is understood that the foregoing description is that of the preferred embodiments of the invention and that various changes and modifications may be made thereto without departing from the spirit and scope of the invention as defined in the appended claims.

What is claimed is:

1. A method for providing a reliable operation of a motor vehicle which utilizes signals of a road speed sensor during operation of the engine including during start-up, the method comprising the steps of:

checking the functional operability of said sensor, said sensor emitting a base signal when the variable said sensor measures takes on a base value with the base signal being identical to the signal the sensor emits when defective;

starting a first substitute/emergency-function as soon as the sensor emits a base signal;

then checking as to whether the sensor is with certainty functionally inoperative; and, if the sensor is functionally operative, discontinuing said first substitute/emergency-function; and, if functionally inoperative, then maintaining the substitute/emergency-function until the sensor is again functionally operational.

2. The method of claim 1, wherein said first substitute/emergency-function is so configured that there is no noticeable effect when the vehicle operates normally when the variable to be measured takes on its base value or lies in the region thereof.

3. The method of claim 1, comprising the further step of switching over to a second substitute/emergency-function which provides more significant operating limits than said first substitute/emergency-function when the functional inoperability of the checked sensor is determined with certainty.

4. A method for providing a reliable operation of a motor vehicle which utilizes signals of a road-speed transducer during operation, the method comprising the steps of:

checking the functional operability of the road-speed transducer by determining the load value of the engine driving the motor vehicle; the transducer emitting a base signal when the variable said transducer measures takes on a base value with the base signal being identical to the signal the transducer emits when defective;

starting a first substitute/emergency-function as soon as the transducer emits a base signal;

then checking as to whether the transducer is with certainty functionally inoperative by concluding that the road-speed transducer is functionally inoperable when the determined load value is greater than the maximum possible load value at zero load on the engine and maintaining the substitute/emergency-function until the transducer is again functionally operational; and, if the transducer is functionally operative, discontinuing said first substitute/emergency-function.

5. The method of claim 4, for a pregiven time interval, checking to determine whether the load condition of the engine is greater than the maximum possible zero load and whether the rotational speed of the engine is greater than a minimum speed which is the maximum that can be reached when attempting to start the engine; and, making the decision of functional inoperability when both checking conditions are fulfilled.

6. The method of claim 4, for a pregiven time interval, checking whether the rotational speed of the engine is greater than the idle speed and whether an overrun condition is present and making the decision of functional inoperability when both checking conditions are fulfilled.

7. The method of claim 5, wherein the check is made for a motor vehicle having intermediate speed control only when the intermediate speed control is switched off.

8. The method of claim 4, checking as to whether the engine and the drive wheels of the motor vehicle are connected to each other via the transmission and checking if the rotational speed of the engine is greater than a pregiven speed, and making the decision as to functional inoperability when both checking conditions are fulfilled.

9. A method for providing a reliable operation of a motor vehicle which utilizes signals of an engine speed transducer during operation, the method comprising the steps of:

checking the functional operability of the engine speed transducer by determining whether the drive wheels of the motor vehicle are connected to the engine thereof and measuring the road speed; and, starting a first substitute/emergency-function as soon as the transducer emits a base signal;

then checking as to whether the transducer is with certainty functionally inoperative by concluding that the engine speed transducer is functionally inoperable when the detected road speed is greater than a minimal speed and maintaining said substitute/emergency-function until the transducer is again functionally operational; and, if the transducer is functionally operative, discontinuing said first substitute/emergency-function.

10. A method for providing a reliable operation of a motor vehicle which utilizes signals of an engine speed sensor during operation including during start-up, the method comprising the steps of:

checking the functional operability of said sensor, said sensor emitting a base signal when the variable said sensor measures takes on a base value with the base signal being identical to the signal the sensor emits when defective;

starting a first substitute/emergency-function as soon as the sensor emits a base signal;

then checking as to whether the sensor is with certainty functionally inoperative; and, if the sensor is functionally operative, discontinuing said first substitute/emergency-function; and, if functionally inoperative, then maintaining the substitute/emergency-function until the sensor is again functionally operational.

11. The method of claim 10, wherein said first substitute/emergency-function is so configured that there is no noticeable effect when the vehicle operates normally when the variable to be measured takes on its base value or lies in the region thereof.

12. The method of claim 10, comprising the further step of switching over to a second substitute/emergency-function which provides more significant operating limits than said first substitute/emergency-function when the functional inoperability of the checked sensor is determined with certainty.

13. The method of claim 10, wherein the sensor is an engine speed sensor and a reliable statement is obtained when checking the functional operability of the engine speed sensor with the steps of: determining whether the drive wheels of the motor vehicle are connected to the engine thereof; measuring the road speed; and, concluding that the engine speed sensor is functionally inoperable when the detected road speed is greater than a minimal speed.

14. A method for providing a reliable operation of a motor vehicle which utilizes signals of no-load contact sensor during operation including during start-up, the method comprising the steps of:

checking the functional operability of said sensor, said sensor emitting a base signal when the variable said sensor measures takes on a base value with the base signal being identical to the signal the sensor emits when defective;

starting a first substitute/emergency-function as soon as the sensor emits a base signal;

then checking as to whether the sensor is with certainty functionally inoperative; and, if the sensor is functionally operative, discontinuing said first substitute/emergency-function; and, if functionally inoperative, then maintaining the substitute/emergency-function until the sensor is again functionally operational.

15. The method of claim 14, wherein said first substitute/emergency-function is so configured that there is no noticeable effect when the vehicle operates normally when the variable to be measured takes on its base value or lies in the region thereof.

16. The method of claim 14, comprising the further step of switching over to a second substitute/emergency-function which provides more significant operating limits than said first substitute/emergency-function when the functional inoperability of the checked sensor is determined with certainty.

* * * * *